(12) United States Patent
Jens (10) Patent No.: US 9,119,388 B2
(45) Date of Patent: Sep. 1, 2015

(54) SELECTIVELY ERADICATING PLANTS

(71) Applicant: Stephen Jens, Winchester, MA (US)

(72) Inventor: Stephen Jens, Winchester, MA (US)

(73) Assignee: Harvest Moon Automation Inc., Winchester, MA (US)

( * ) Notice: Subject to any disclaimer, the term of this patent is extended or adjusted under 35 U.S.C. 154(b) by 200 days.

(21) Appl. No.: 13/834,275

(22) Filed: Mar. 15, 2013

(65) Prior Publication Data

US 2014/0260148 A1 Sep. 18, 2014

(51) Int. Cl.
*A01M 21/02* (2006.01)
*A01B 41/04* (2006.01)

(52) U.S. Cl.
CPC .............. *A01M 21/02* (2013.01); *A01B 41/04* (2013.01)

(58) Field of Classification Search
CPC ........ A01B 41/00; A01B 41/06; A01B 41/04; A01B 39/08; A01B 39/085; A01B 39/18; A01B 33/04; A01B 45/00; A01B 45/02; A01B 41/02; A01D 41/04; A01D 41/127; A01D 34/03; A01D 34/032; A01D 34/06; A01D 34/065; A01D 34/001; A01D 27/04; A01D 25/04; A01D 25/044; A01D 23/02; A01F 7/06; A01M 21/00; A01M 21/02
See application file for complete search history.

(56) References Cited

U.S. PATENT DOCUMENTS

| | | | | | |
|---|---|---|---|---|---|
| 2,527,974 | A | * | 10/1950 | Tostenrud et al. | 172/45 |
| 2,533,793 | A | * | 12/1950 | Hamlett | 171/12 |
| 2,694,968 | A | * | 11/1954 | Gatti | 172/71 |
| 2,864,292 | A | * | 12/1958 | Elliott et al. | 172/6 |
| 2,952,324 | A | * | 9/1960 | Shumaker et al. | 172/550 |
| 3,452,822 | A | | 7/1969 | Gugenhan et al. | |
| 3,599,354 | A | * | 8/1971 | Larson | 37/344 |
| 3,783,593 | A | * | 1/1974 | Ernst | 56/14.4 |
| 4,027,733 | A | * | 6/1977 | Eisenhardt et al. | 171/58 |
| 4,117,888 | A | | 10/1978 | Fuller et al. | |
| 4,121,668 | A | * | 10/1978 | Miner | 172/42 |

(Continued)

FOREIGN PATENT DOCUMENTS

| CN | 101961003 A | 2/2011 |
|---|---|---|
| GB | 440372 A | 12/1935 |

(Continued)

OTHER PUBLICATIONS

Authorized Officer T. Vladimirova, International Search Report and Written Opinion for International Application No. PCT/US2014/014574, mailed Apr. 29, 2014, 6 pages.

(Continued)

*Primary Examiner* — Kathleen Alker
(74) *Attorney, Agent, or Firm* — Fish & Richardson P.C.

(57) ABSTRACT

A method of selectively eradicating plants includes generating images of multiple plants arranged in a bed using a camera mounted to a mobile chassis moving along the bed, determining respective locations of the multiple plants from the generated images, selecting from among the multiple plants one or more target plants to be eradicated, and eradicating the one or more target plants by accelerating a blade of a rotary cutter to strike the one or more target plants as the mobile chassis moves along the bed, and to decelerate the blade to avoid eradicating unselected plants as the mobile chassis moves along the bed, wherein the rotary cutter is carried by the mobile chassis and rotatable about an axis extending in the direction along which the mobile chassis is moved.

24 Claims, 11 Drawing Sheets

(56) References Cited

U.S. PATENT DOCUMENTS

| | | |
|---|---|---|
| 4,535,881 A | 8/1985 | Mims |
| 4,879,025 A | 11/1989 | Shapcott |
| 5,442,552 A | 8/1995 | Slaughter et al. |
| 5,855,246 A | 1/1999 | Bruce |
| 6,182,770 B1 | 2/2001 | Pickett et al. |
| 6,325,156 B1 | 12/2001 | Barry |
| 7,032,369 B1 | 4/2006 | Eaton et al. |
| 7,240,784 B2 | 7/2007 | Bonnain et al. |
| 7,604,067 B1 * | 10/2009 | Kornecki et al. ............. 172/175 |
| 2002/0112461 A1 | 8/2002 | Burk |
| 2005/0072135 A1 * | 4/2005 | Kormann ................... 56/500 |
| 2005/0230221 A1 | 10/2005 | Guglielmo et al. |
| 2006/0162309 A1 | 7/2006 | Schloesser |
| 2008/0053671 A1 | 3/2008 | Buckrell et al. |
| 2009/0226036 A1 | 9/2009 | Gaal |
| 2011/0073332 A1 | 3/2011 | Ward |
| 2011/0211733 A1 | 9/2011 | Schwarz |
| 2012/0241177 A1 * | 9/2012 | Bourquin ..................... 171/58 |
| 2013/0238201 A1 | 9/2013 | Redden |
| 2014/0180549 A1 * | 6/2014 | Siemens et al. ................. 701/50 |
| 2014/0259898 A1 | 9/2014 | Jens |
| 2014/0319253 A1 | 10/2014 | Nuernberg et al. |

FOREIGN PATENT DOCUMENTS

| | | |
|---|---|---|
| JP | H09137 A | 1/1997 |
| WO | WO0003589 A1 | 1/2000 |
| WO | WO2006021207 A1 | 3/2006 |
| WO | WO2011152719 A1 | 12/2011 |
| WO | WO2014143446 A1 | 9/2014 |

OTHER PUBLICATIONS

"Gonzales' Ramsay Highlander touts mechanical weeder," The Salinas Californian, Jan. 26, 2013, 3 pages.

* cited by examiner

FIG. 11

SELECTIVELY ERADICATING PLANTS

TECHNICAL FIELD

This invention relates to selectively eradicating plants, and more particularly to mechanically thinning and/or weeding crops in an automated manner.

BACKGROUND

Cultivating crops often involves routine thinning and weeding of the crops. Thinning a field of plants can include destroying and/or removing certain plants in order to maintain a desired spacing between remaining plants (e.g., saved plants). Weeding a field of plants can include destroying and/or removing undesired growths located in proximity to the plants. Thinning and weeding are often performed manually using a standard garden tool (e.g., a hoe) to remove a plant or weed, which can be a laborious task. Thinning and weeding may also be performed using chemical treatments (e.g., fertilizers or herbicides) that may be sprayed on the plants and weeds to chemically kill the plants and weeds. Such chemical treatments can require precise application, may be limited in chemical effectiveness, and may be prohibited on certain (e.g., organic) farms. Additionally, manual and chemical thinning and weeding techniques may be associated with significant costs, risks to personnel safety, and risks to food safety.

SUMMARY

The invention involves a realization that mechanically thinning and weeding plants in an automated manner can increase the precision of a thinning and weeding operation, while eliminating the need to use chemical treatments, eliminating disadvantages associated with such treatments, and reducing costs associated with manual thinning and weeding operations.

One aspect of the invention features a method of selectively eradicating plants, including generating images of multiple plants arranged in a bed using a camera mounted to a mobile chassis moving along the bed, determining respective locations of the multiple plants from the generated images, selecting from among the multiple plants one or more target plants to be eradicated, and eradicating the one or more target plants by accelerating a blade of a rotary cutter to strike the one or more target plants as the mobile chassis moves along the bed, and to decelerate the blade to avoid eradicating unselected plants as the mobile chassis moves along the bed, wherein the rotary cutter is carried by the mobile chassis and rotatable about an axis extending in the direction along which the mobile chassis is moved.

Another aspect of the invention features a plant eradication system that includes a mobile chassis, a camera carried by the mobile chassis and configured to generate images of the multiple plants arranged in a bed as the mobile chassis is moved in a direction along the bed, a processor configured to determine respective locations of the multiple plants from the generated images, a controller configured to select one or more target plants from among the multiple plants for eradication, and a rotary cutter carried by the mobile chassis and rotatable about an axis extending in the direction along which the mobile chassis is moved along the bed, wherein the rotary cutter is responsive to the controller to accelerate a blade of the rotary cutter to strike a selected plant as the mobile chassis is moved along the bed, and to decelerate the blade to avoid eradicating unselected plants as the mobile chassis is moved along the bed.

In some embodiments, the camera that is directed towards the bed and a processor is operable to analyze the images.

In certain embodiments, a hood surrounds the camera.

In some embodiments, the method further includes identifying the multiple plants in the image using a recognition algorithm.

In certain embodiments, the multiple plants include one or more of beets, carrots, lettuce, romaine, onions, parsnips, radishes, rutabagas, spinach, corn, and turnips.

In certain embodiments, selecting the one or more target plants includes comparing the respective locations of the multiple plants to a predetermined spacing.

In some embodiments, the method further includes identifying one or more plants that are positioned within the predetermined spacing as the one or more target plants.

In certain embodiments, eradicating the one or more target plants includes severing leaves and stems of the one or more target plants.

In some embodiments, the method further includes identifying one or more weeds in the bed using a recognition algorithm.

In certain embodiments, the method further includes cutting the one or more weeds using the rotary cutter.

In some embodiments, the rotary cutter includes one or more arms extending from a rotational center of the rotary cutter and defining gaps therebetween and one or more blades that extend from ends of the one or more arms, respectively.

In certain embodiments, the rotary cutter is responsive to a controller to position the rotary cutter such that the unselected plants pass through the one or more gaps.

In some embodiments, the one or more blades are configured to cut the multiple plants.

In certain embodiments, the one or more blades extend from the one or more arms in a direction of travel of the mobile chassis.

In some embodiments, the one or more blades extend from the one or more arms in a direction opposed to a direction of travel of the mobile chassis.

In certain embodiments, arms of the rotary cutter are oriented within a single plane.

In some embodiments, arms of the rotary cutter are oriented within respective perpendicular planes.

In certain embodiments, the method further includes eradicating the one or more target plants by dragging the rotary cutter along the bed.

In some embodiments, the rotary cutter is movable via a floating frame configured to move vertically as a function of a height of the surface of the bed.

In certain embodiments, a vertical adjustment device is mounted to the floating frame, the vertical adjustment device supporting the rotary cutter.

In some embodiments, prior to eradicating the one or more target plants, the rotary cutter is moved in a lateral direction by an actuator configured to translate the rotary cutter.

In certain embodiments, the images are generated, the respective locations of the multiple plants are determined, the one or more target plants are selected, and the one or more target plants are eradicated, while the mobile chassis moves at a constant speed along the bed.

In some embodiments, the controller is configured to control the rotary cutter via one or more of a rotary motor and an actuator.

In some embodiments, the plant eradication system further includes a floating frame that is configured to move vertically as a function of a height of a surface of the bed.

In certain embodiments, the plant eradication system further includes a vertical adjustment device that is mounted to the floating frame, the vertical adjustment device supporting the rotary cutter.

In some embodiments, the plant eradication system further includes a rotary motor that is communicably coupled to the controller and that is configured to rotate the cutter.

In certain embodiments, the plant eradication system further includes an actuator that is communicably coupled to the controller and that is configured to translate the cutter.

In some embodiments, the plant eradication system further includes an encoder that is communicably coupled to the controller and that is configured to detect a speed at which the chassis moves along the bed.

In certain embodiments, the plant eradication system operates autonomously.

In some embodiments, the plant eradication system is moved along the bed by a tractor.

Embodiments may include one or more of the following advantages. The method and system may be used to mechanically thin and weed undesired plants without damaging desired plants that are to be saved and without using chemical treatments (e.g., fertilizers or herbicides) to remove the undesired plants and weeds. Accordingly, expenses that would otherwise be incurred by purchasing and using chemical treatments and the risks to food safety associated with using such chemical treatments may also be substantially reduced or eliminated. In some examples, the mechanical action performed by the plant eradication system can be particularly beneficial on organic farms, where the use of certain chemical treatments may be prohibited. Furthermore, the automated actions performed by the plant eradication system can alleviate the need to manually identify and remove undesired plants and weeds, thereby saving time and substantially reducing costs.

The details of one or more embodiments of the invention are set forth in the accompanying drawings and the description below. Other features, aspects, and advantages of the invention will be apparent from the description, drawings, and claims.

BRIEF DESCRIPTION OF THE DRAWINGS

Like reference symbols in the various figures indicate like elements.

DETAILED DESCRIPTION

A thinning and weeding system for thinning and weeding a variety of crops will be described below. In some embodiments, the thinning and weeding system includes mechanical cutters, a machine vision system, and associated control elements that allow the thinning and weeding system to mechanically remove undesired crops and save desired crops in an automated manner, thereby substantially eliminating a need to use chemical treatments for thinning and weeding the crops. In some examples, the crops may be planted by seed. Example crops that may be thinned and weeded by the thinning and weeding system include beets, carrots, lettuce, romaine, onions, parsnips, radishes, rutabagas, spinach, corn, turnips, and other crops.

Figure 1:
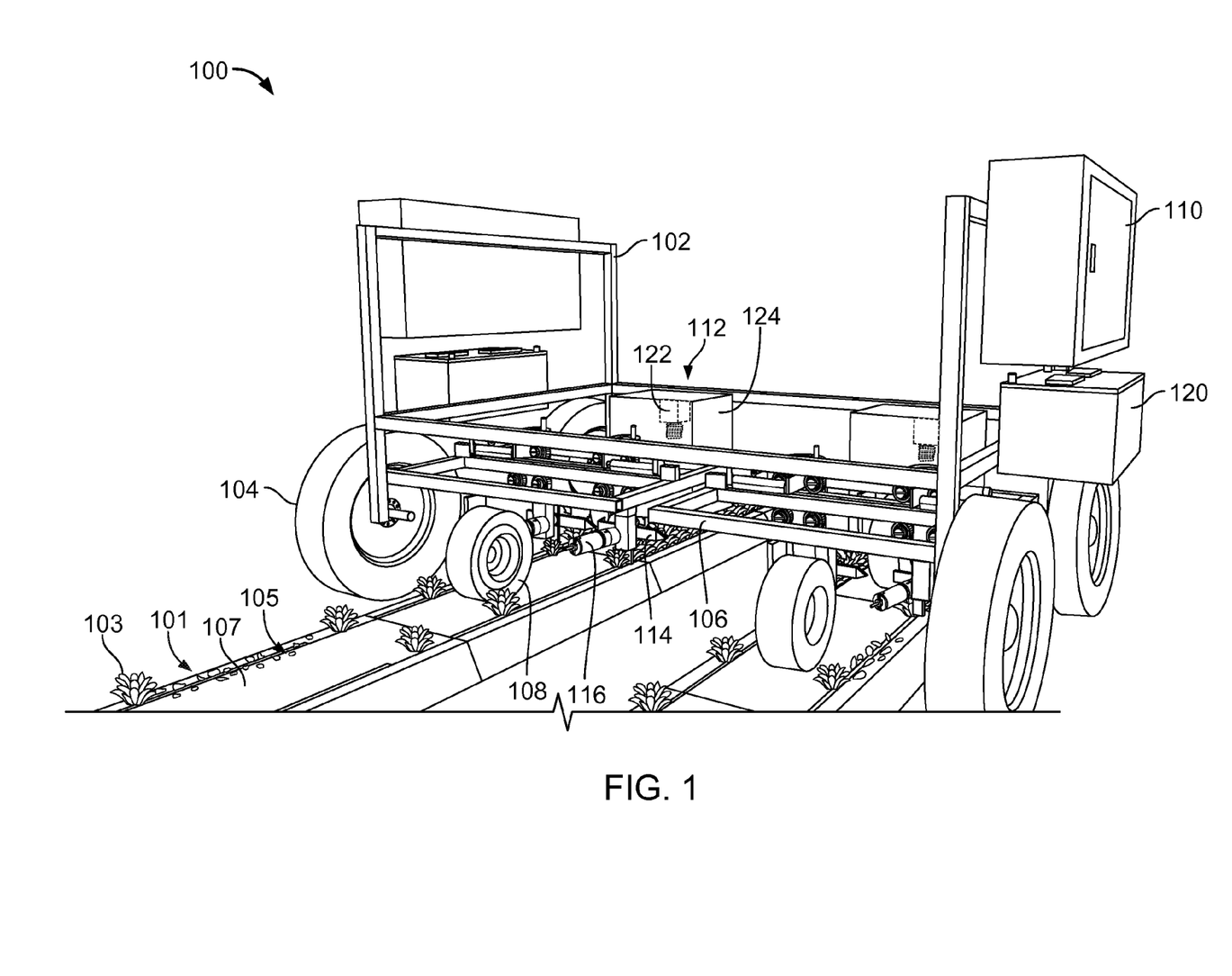
FIG. 1 is a rear perspective view of a thinning and weeding system.
Figure 2:
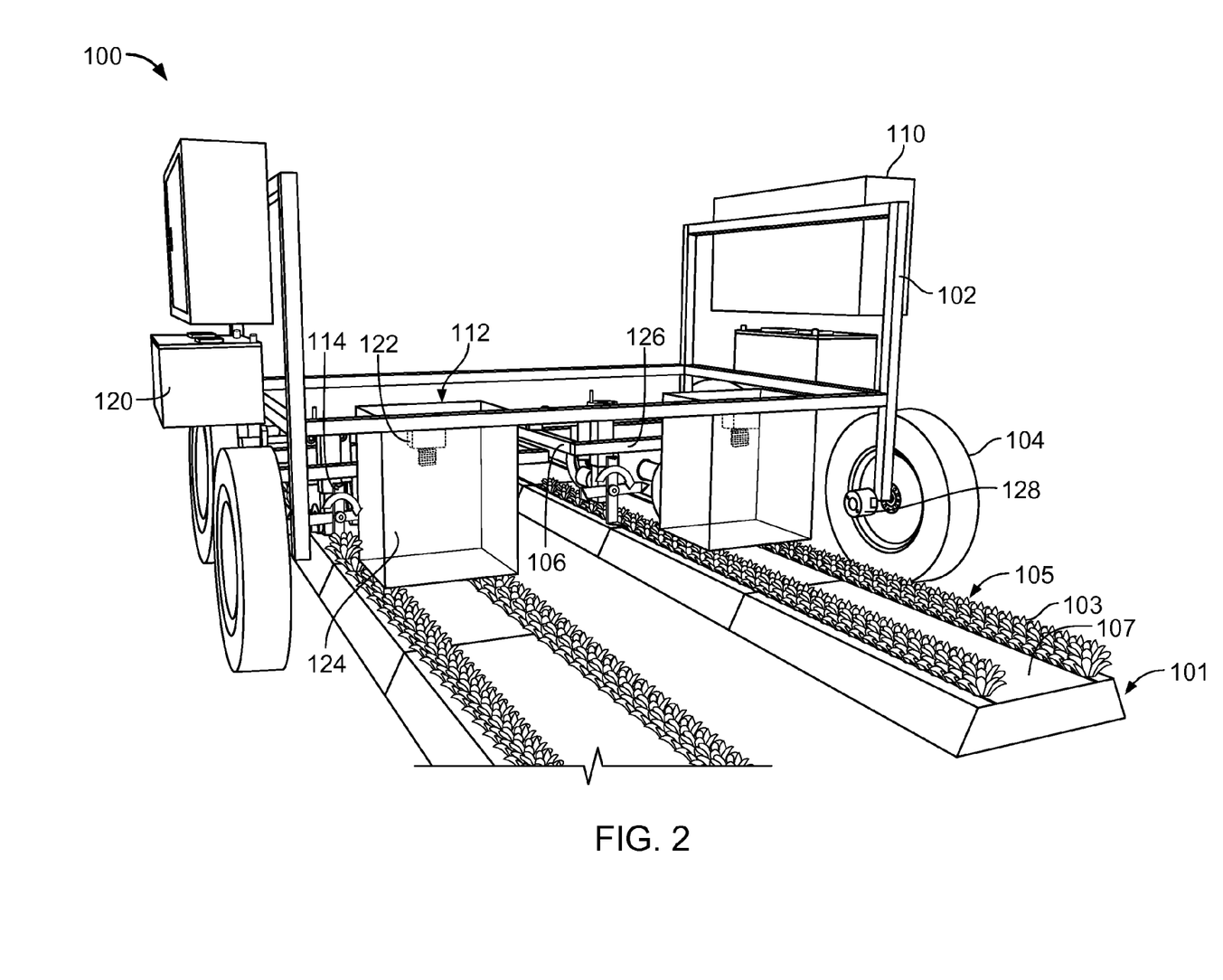
FIG. 2 is a front perspective view of the thinning and weeding system of FIG. 1.

FIGS. 1 and 2 display rear and front perspective views, respectively, of a thinning and weeding system 100 that is operable to mechanically thin and weed a variety crops in an automated manner. In some examples, the thinning and weeding system 100 may be configured to operate autonomously, as will be described in more detail below, or may be configured to operate with other vehicles, as will be described in detail with respect to FIG. 11. In the example of FIGS. 1 and 2, the thinning and weeding system 100 is positioned over two spaced apart beds 101 of plants 103 that are located in a field of plants. As illustrated, the plants 103 are arranged in two opposing seed lines 105 along a surface 107 of each bed 101. In some examples, the beds 101 may be spaced about 14 inches to about 22 inches (e.g., 18 inches) apart, depending on the type of plants 103 being cultivated in the beds 101. In some examples, the two opposing seed lines 105 of plants 103 may be spaced about 10 inches to about 14 inches (e.g., 12 inches) apart along the bed 101, depending on the type of plants 103 being cultivated in the beds 101. In some examples, the plants 103 may be spaced about 1.5 inches to about 2 inches (e.g., 1.75 inches) apart, depending on the type of plants 103 being cultivated.

The thinning and weeding system 100 includes an upper frame 102 supported by four outer wheels 104, two adjacent lower frames 106 that are each supported by two inner wheels 108, and two electrical enclosures 110 mounted to opposing sides of the upper frame 102. The thinning and weeding system 100 further includes a machine vision system 112 that identifies plants 103 and weeds (not shown) that need to be removed from the surfaces 107 of the beds 101 and a programmable logic controller (PLC) that is located within one of the electrical enclosures 110 and that is electrically coupled to the machine vision system 112. The thinning and weeding system 100 additionally includes four cutters 114 that are operable to mechanically remove the identified plants 103 and weeds from the surfaces 107 of the beds 101, four respective motors 116 that are operable to rotate the cutters 114, and an encoder 128 that is operable to detect an angular velocity of the outer wheels 104. Additionally, the thinning and weeding system 100 includes a GPS system (located, for example, within one of the electrical enclosures 110) that provides a field location to the PLC and a generator (not shown) that provides power to the thinning and weeding system 100. The thinning and weeding system 100 further includes high capacity batteries 120 that can power the thinning and weeding system 100 for a limited period of time should the generator malfunction.

The various components of the thinning and weeding system 100 may be powered by, for example, hydraulic or electrical mechanisms that are known to a person skilled in the art. In some examples, the generator converts the hydraulic power to electrical power to provide functionality to the various components of the thinning and weeding system 100.

In some embodiments, the outer wheels 104 have a radius of about 6 inches to about 12 inches (e.g., 9 inches), thereby positioning the upper frame 102 (e.g., and any components mounted to the upper frame 102) of the thinning and weeding system 100 above the level of the field. In some embodiments, the inner wheels 108 have a radius of about 2 inches to about 4 inches (e.g., 3 inches), thereby positioning the lower frames 106 (e.g., and any components mounted to the lower frame 106) of the thinning and weeding system 100 above the surfaces 107 of the beds 101 of plants 103. In this manner, the lower frames 106 are floating frames that have an adjustable height relative to the upper frame 102 such that the thinning and weeding system 100 may adapt to a variable height of the surfaces 107 of the beds 101 of plants 103. As illustrated, the lower frames 106 are attached to opposing sides of the upper frame 102 such that each lower frame 106 is aligned with a respective bed 101 of plants 103. In some embodiments, the lower frame 106 is attached to the upper frame via a four bar linkage mechanism.

Still referring to FIGS. 1 and 2, the machine vision system 112 includes two cameras 122 and two respective hoods 124 that surround the cameras 122. The cameras 122 and the hoods 124 are located along a frontal member 126 of the upper frame 102. The cameras 122 are oriented and positioned to image respective fields of view along the beds 101 of plants 103. In the example embodiment of FIGS. 1 and 2, the cameras 122 and the respective hoods 124 may be spaced apart by about 38 inches to about 44 inches (e.g., 40 inches) along the frontal member 126 of the upper frame 102. The hoods 124 are adapted to block (e.g., reduce the amount of) natural light (e.g., which varies depending on a season, weather, and a time of day) from impinging upon the fields of view.

The cameras 122 include light-emitting diodes (LEDs) and filters for sufficient illumination and desired image characteristics. The cameras 122 may be standard resolution, color video graphics array (VGA) cameras known to a person skilled in the art. For example, the cameras 122 may have a pixel count of 480×640, thereby allowing each camera 122 to capture both seed lines 105 of the respective bed 101 of plants 103 within one field of view (e.g., a 14 inch×18 inch field of view). The camera resolution (e.g., pixel dimension) of such a field of view may be 0.030 inch, which is adequate for identifying individual leaves of the plants 103 and weeds. Processors of the cameras 122 may have a frame processing time of 25 ms and accordingly allow the cameras 122 to acquire images at a rate of 40 fps, which is fast enough to map locations of the plants 103 while the thinning and weeding system 100 moves at a predetermined speed (e.g., 2 ft/sec). Following capture of an image by a camera 122, the image is processed by the processor of the camera 122 and further analyzed according to an algorithm that identifies a location (e.g., using an XY coordinate system) of a plant 103 or weed with respect to the camera 122, as will be described in more detail with respect to FIG. 7.

Figure 3:
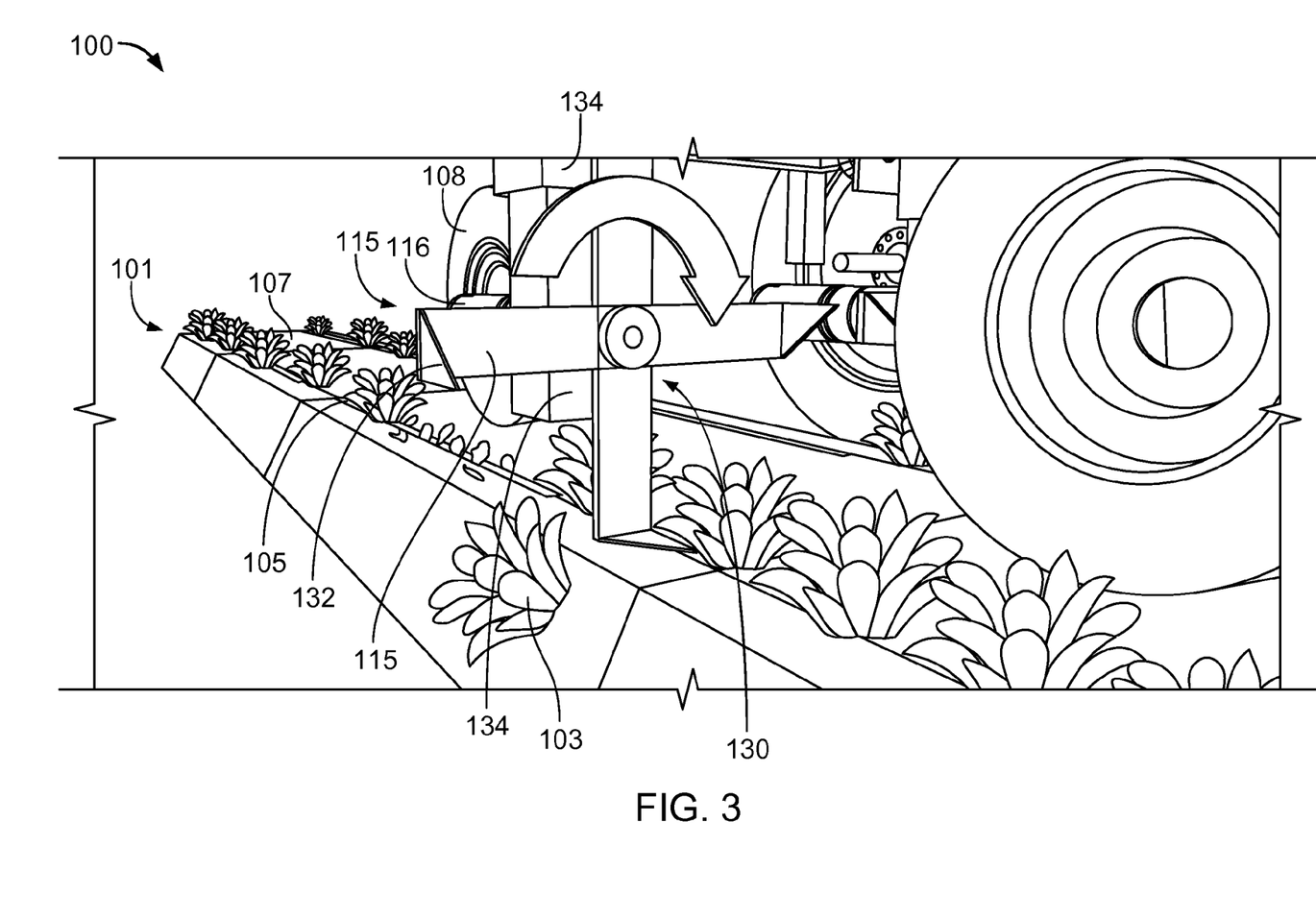
FIG. 3 is a perspective view showing a portion of the thinning and weeding system of FIG. 1, including a cutter with arms oriented within a single plane, as the cutter eradicates a plant disposed within a bed of plants.
Figure 4:
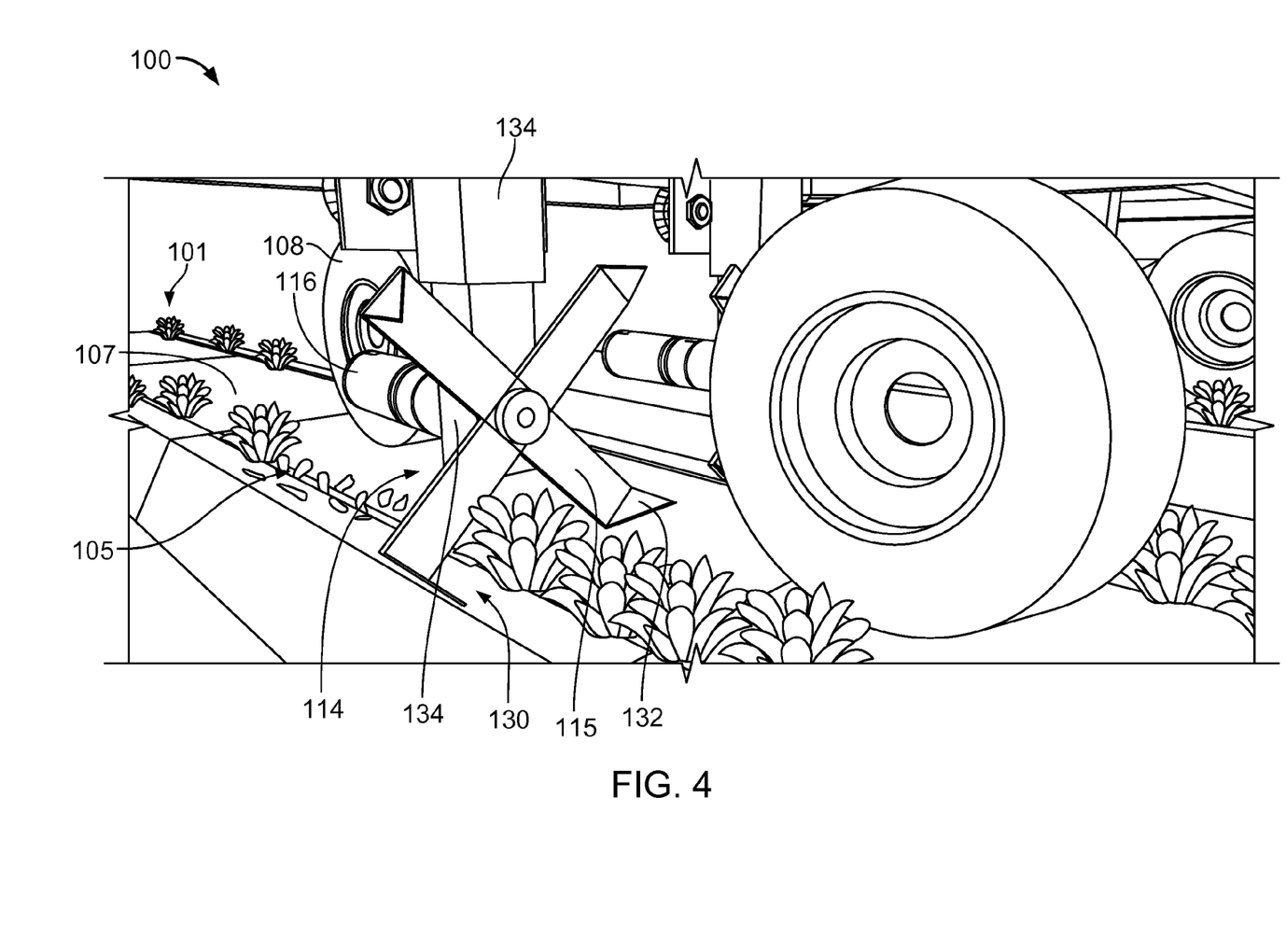
FIG. 4 is a perspective view showing the portion of the thinning and weeding system of FIG. 3, including the cutter, as the cutter passes over a plant disposed within the bed of plants.

FIGS. 3 and 4 display perspective views of one of the cutters 114 while cutting an undesired plant 103 and while saving a desired plant 103 and, respectively. Two cutters 114 are mounted to each lower frame 106 and are spaced apart such that the cutters 114 are located on opposing sides of the inner wheels 108 of the respective lower frames 106. The cutter 114 is operable to rotate with respect to the lower frame 106 about an axis this parallel to a direction of travel of the thinning and weeding system 100. Each cutter 114 is rotated by the respective motors 116 (e.g., servo-controlled motors) located near centers of the cutters 114, as will be described in more detail with respect to FIG. 7.

The cutter 114 includes four arms 115 and four respective knives 132 (e.g., blades) that extend from ends of the arms 115. The arms 115 of the cutter 114 have a generally rectangular shape and are oriented within a single plane that is substantially perpendicular to a direction of travel of the thinning and weeding system 100. The arms 115 of the cutter 114 are further oriented perpendicular to each other. Accordingly, the knives 132 are spaced about 90 degrees apart from each other. The configuration of the cutter 114 defines four gaps 130 that allow desired plants 103 to be saved as the cutter 114 rotates with respect to the lower frame 106 while the thinning and weeding system 100 moves along the beds 101 of plants 103. Accordingly, the gaps 130 include an angle of about 90 degrees. The arms 115 of the cutter 114 are generally sized such that the gaps 130 of the cutter 114 may be aligned to surround the desired plants 103 as the cutter 116 rotates. In some examples, the arms 115 have a width of about ¾ inch to about 1.5 inches (e.g., 1 inch), a length of about 4 inches to about 6 inches (e.g., 5 inches), and a thickness of about ⅛ inch to about ⅜ inch (e.g., ¼ inch). In some examples, the cutter 114 may be rotated at a speed of about 150 rpm to about 250 rpm (e.g., 200 rpm).

The knives 132 are configured to sever leaves and stems from roots of undesired plants 103 as the cutter 114 rotates with respect to the lower frame 106 while the thinning and weeding system 100 moves along the beds 101 of plants 103. The knives 132 extend substantially perpendicularly from respective ends of the arms 115 towards the direction of travel of the thinning and weeding system 100. The knives 132 have a generally triangular shape. In some examples, the knives 132 have a width of about ¾ inches to about 1.5 inches (e.g., 1 inch), a length of about 1.5 inches to about 3 inches (e.g., 2 inches), and a thickness of about 1/16 inch to about 3/16 inch (e.g., ⅛ inch).

Figure 5:
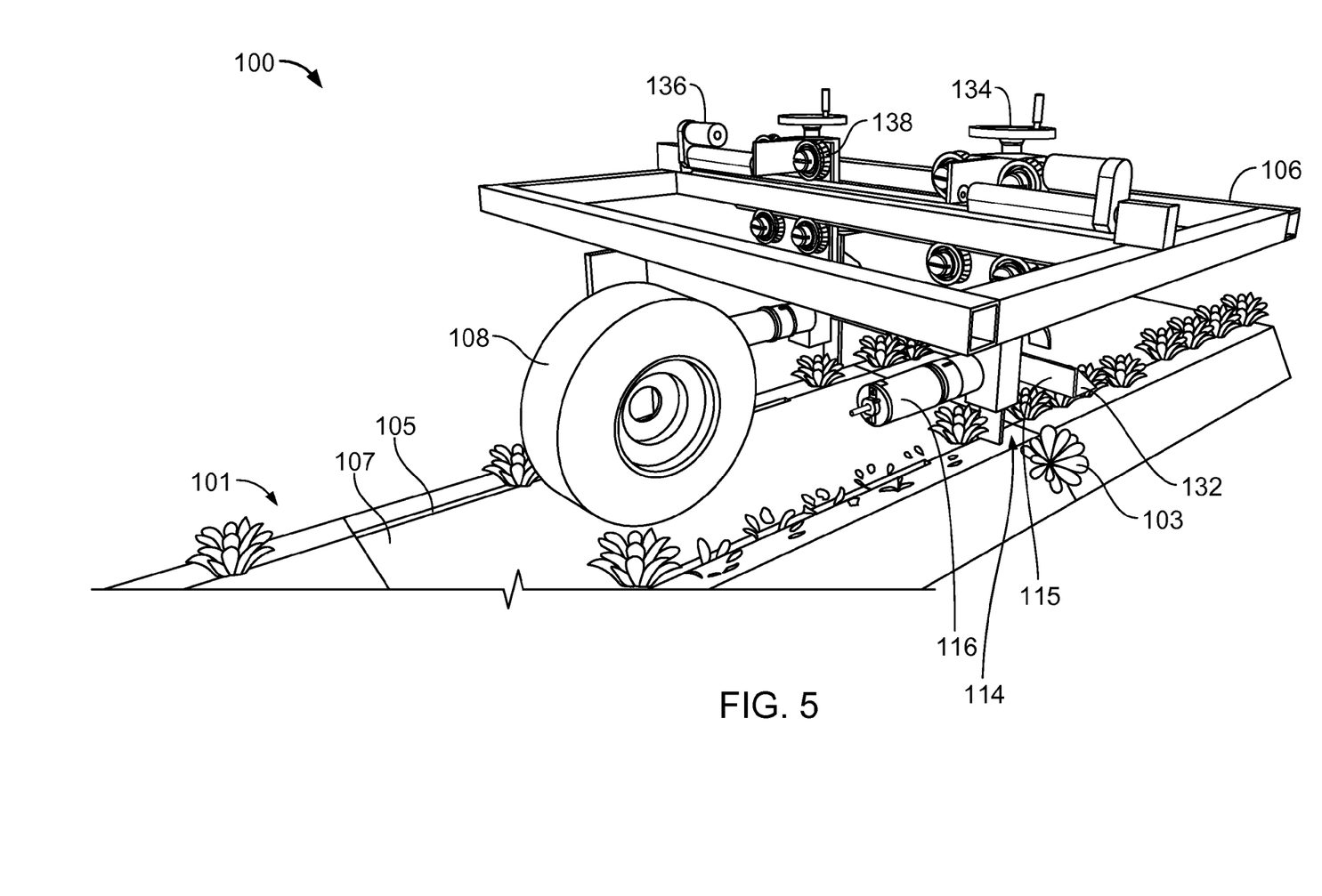
FIG. 5 is a perspective view showing a portion of the thinning and weeding system of FIG. 1, including a lower frame that supports the cutter of FIG. 3.
Figure 6:
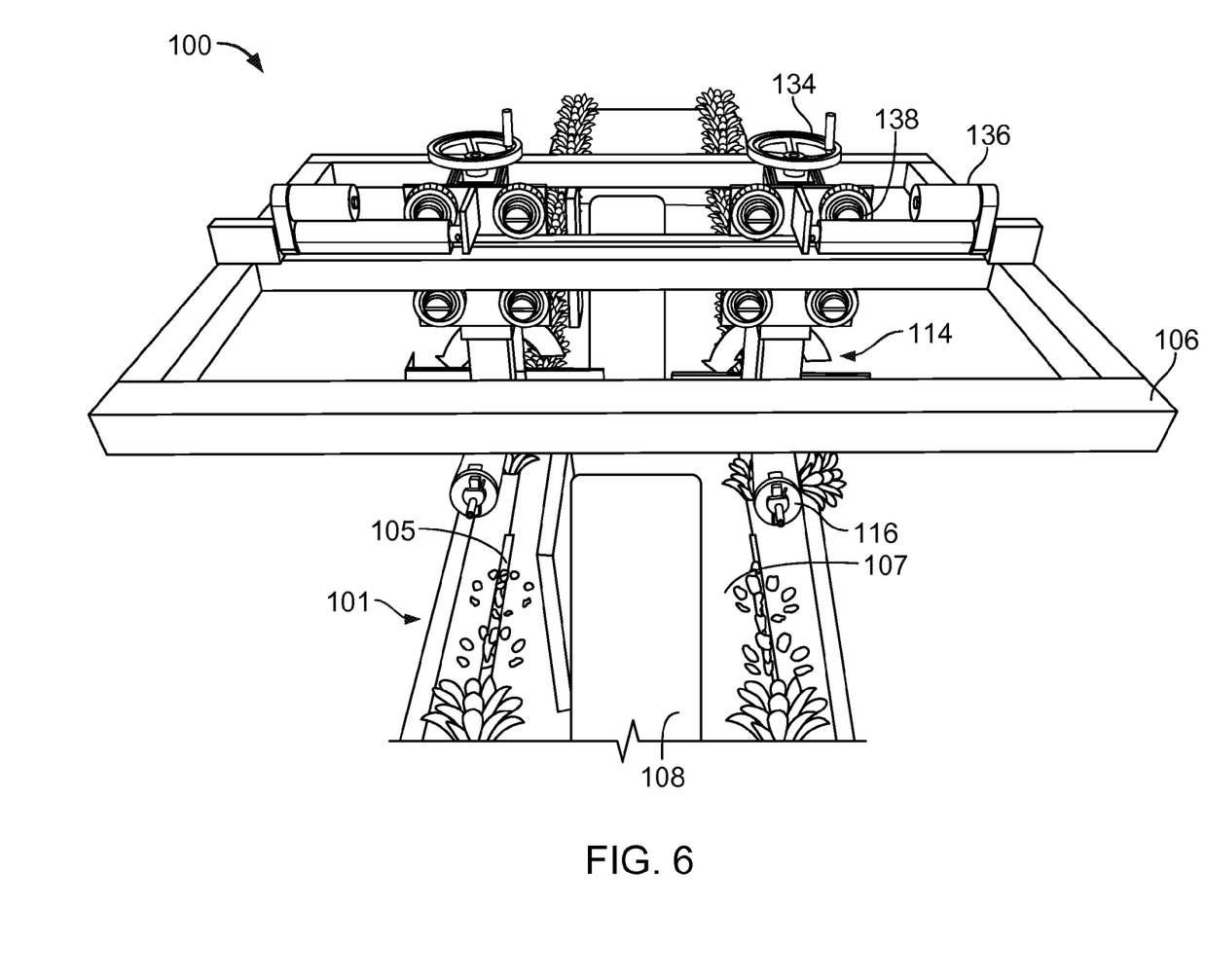
FIG. 6 is a rear perspective view showing the portion of the thinning and weeding system of FIG. 5, including the lower frame that supports the cutter of FIG. 3.

FIGS. 5 and 6 displays perspective views of two cutters 114 supported by the lower frame 106 of the thinning and weeding system 100. In particular, each cutter 114 is supported by a vertical adjustment device 134 that is mounted to the lower frame 106 and that includes an internal rotating gear mechanism (e.g., a threaded rod). The vertical adjustment device 134 can variably lower the cutter 114 to an appropriate location above the surface 107 of the bed 101. Additionally, two actuators 136 (e.g., servo drive actuators) are located on each lower frame 106 and are operable to translate the respective cutters 114 in a direction transverse to the seed lines 105 such that the cutters 114 can be aligned with the seed lines 105 as the seed lines 105 vary in position (e.g., lateral position). Accordingly, the cutters 114 may also be positioned to remove weeds located between the opposing seed lines 105. Cam rollers 138 mounted to respective vertical adjustment devices 134 allow the cutters 114 to move smoothly with respect to the lower frames 106 as the thinning and weeding system 100 moves along the beds 101 of plants 103.

In operation, the thinning and weeding system 100 travels along the beds 101 of plants 103. In some examples, the thinning and weeding system 100 travels in an autonomous manner. For example, the thinning and weeding system 100 uses analyses of the images captured by the machine vision system 112, as well as field locations provided by the GPS system, to guide itself along the beds 101 of plants 103. Additionally, the thinning and weeding system 100 uses a field mapping provided by the GPS system to determine when the thinning and weeding system 100 has reached an edge of the field and accordingly when to turn and travel in a different direction.

As the thinning and weeding system 100 travels in the field, wireless communication is maintained over a network between a remote operator and the PLC controller and GPS system so that a status of the thinning and weeding system 100 can be monitored. Example parameters that may be monitored by the remote operator include a field location of the thinning and weeding system 100, a velocity of the thinning and weeding system 100 (e.g., an angular velocity of the outer wheels 104 and the inner wheels 108), a number and location of plants 103 that have been eradicated, a number and location of plants 103 that have been saved, a frame rate of the camera, and a rotational speed of the cutter 114. The remote operator may change any of such parameters by sending a signal that includes a corresponding instruction over the network to the PLC of the thinning and weeding system 100. The PLC may accordingly control the corresponding components of the thinning and weeding system 100. In some examples, the remote operator may monitor and control multiple thinning and weeding systems 100 simultaneously.

In some examples, the thinning and weeding system 100 travels at a speed of about 1 ft/sec to about 3 ft/sec (e.g., about 2 ft/sec). The thinning and weeding system 100 moves with respect to the beds 101 of plants 103 such that each camera 122 images a respective bed 101 of plants 103. Accordingly, the outer wheels 104 rotate along outer edges of the beds 101, and the inner wheels 108 rotate between opposing seed lines 105 of respective beds 101.

Figure 7:
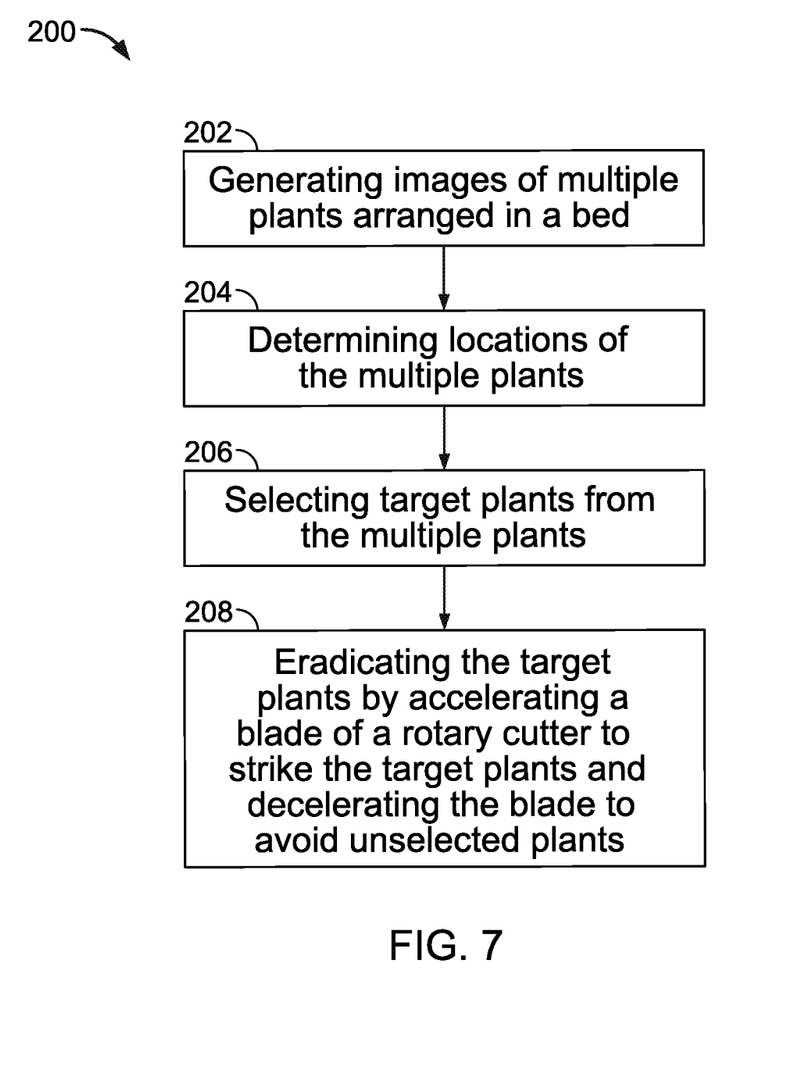
FIG. 7 is a flow chart of an example process for thinning and/or weeding crops.

FIG. 7 displays a flow chart of an example process 200 that may be implemented to thin and/or weed the beds 101 of plants 103 using, for example, the thinning and weeding system 100. As the thinning and weeding system 100 travels, the cameras 122 generate images of the beds 101 of plants 103 (202). In some examples, the cameras 122 acquire images at a rate of 20 fps to 60 fps (e.g., 40 fps). In some examples, the filters on the cameras 122 may produce an image that highlights the plants 103 and weeds in respective desired colors and shows the soil in grayscale. Once the images are acquired, the images are analyzed using algorithms implemented by the respective camera processors. The images may be analyzed using standard algorithms known to a person skilled in the art. In some examples, the analysis identifies the individual plants 103 and weeds and determines their respective locations (e.g., in an XY coordinate system) (204) with respect to the camera 122. In some examples, the processor may distinguish a plant 103 from a weed using a standard recognition algorithm (e.g., pattern recognition) known to a person skilled in the art. The locations of the identified plants 103 and weeds are sent to the PLC, and the PLC determines which plants 103 (e.g., selects target plants) and weeds should be removed from the surface 107 of the beds 101 (206) and which plants 103 should be saved. In some examples, the PLC determines which plants 103 should be removed and which plants 103 should be saved by comparing the locations of the identified plants 103 to a predetermined spacing between consecutive plants 103. For example, plants 103 located at certain interval locations (e.g., corresponding to the predetermined spacing) may be saved, while plants 103 located within the interval locations may be eradicated. In some examples, the predetermined spacing may be between about 8 inches and about 12 inches (e.g., 10.5 inches), depending on the type of plants 103 being cultivated.

As the thinning and weeding system 100 travels along the beds 101 of plants 103, the encoder 128 monitors an angular speed of the outer wheels 104 and sends this information to the PLC. Using the speed of the outer wheels 104 and the determination of which plants 103 should be destroyed and saved, the PLC determines a relationship (e.g., calculates a distance) between the cutters 114 and the plants 103 and weeds. The PLC accordingly controls the motors 116 and the actuators 136 such that the cutters 114 eradicate the undesired plants 103 and weeds by cutting the undesired plants and weeds (208) and pass over the desired plants 103. For example, the cutters 114 may be rotationally accelerated such that the cutters 114 sever leaves from the undesired plants 103 and weeds (e.g., thereby preventing the plants 103 and weeds from growing further). In some examples, the cutters 114 may be rotationally decelerated such that the cutters 114 avoid desired plants 103 (e.g., such that the gaps 130 of the cutters 114 surround the desired plants 103). In this manner, the cutters 114 are rotated at a variable angular speed according to which plants 103 will be destroyed and which plants 103 will be saved. In some examples, two opposing cutters 114 may be rotated synchronously along opposing seed lines 105. In some examples, the two opposing cutters 114 may be rotated asynchronously along the opposing seed lines 105.

Accordingly, the thinning and weeding system 100 may be used to mechanically eradicate undesired plants 103 and weeds within the beds 101 of plants 103 without damaging the desired plants 103 that are to be saved and without using chemical treatments (e.g., fertilizers or herbicides) to eradicate the undesired plants 103 and weeds. Accordingly, expenses that would otherwise be incurred by purchasing and using chemical treatments and the risks to food safety associated with using such chemical treatments may also be substantially reduced or eliminated. In some examples, the mechanical action performed by the thinning and weeding system 100 can be particularly beneficial on organic farms, where the use of certain chemical treatments may be prohibited. Furthermore, such automated actions performed by the thinning and weeding system 100 can alleviate the need to manually identify and remove undesired plants 103 and weeds, thereby saving time and substantially reducing costs.

While the thinning and weeding system 100 has been described and illustrated as including two lower frames 106 with respective cameras 122, cutters 114, and other associated components, in some embodiments, a thinning and weeding system may include more than two lower frames with respective cameras, cutters, and other associated components in order to thin and weed multiple respective beds of plants. In such cases, an upper frame of the thinning and weeding system may be sized for appropriate accommodation of the number of lower frames.

While the thinning and weeding system 100 has been described and illustrated as including two cutters 114 located on opposing sides of the inner wheels 108 of the lower frames 106, in some embodiments, a thinning and weeding system may include a different number of cutters 114 (e.g., three cutters 114) in order to thin and weed a bed of plants 103 including more than two seed lines 105 or in order to remove weeds located between the seed lines 105.

While the thinning and weeding system 100 has been described as including the cutter 114 with arms 115 that are oriented in a single plane that is substantially perpendicular to the direction of travel of the thinning and weeding system 100, in some embodiments, a thinning and weeding system may include a cutter with arms that are oriented in respective perpendicular planes. For example, FIG. 8 displays a perspective view of a portion of a thinning and weeding system 300 that includes a cutter 314 that includes arms 315 that are oriented in respective perpendicular planes. The thinning and weeding system 300 is substantially similar in construction and function to the thinning and weeding system 100, with the exception that the thinning and weeding system 300 includes the cutter 314 instead of the cutter 114. For example, the thinning and weeding system 300 includes the machine vision system 112, the lower frames 106, the inner wheels 108, the vertical adjustment devices 134, the motors 116, the actuators 136, and other components of the thinning and weeding system 100.

Figure 8:
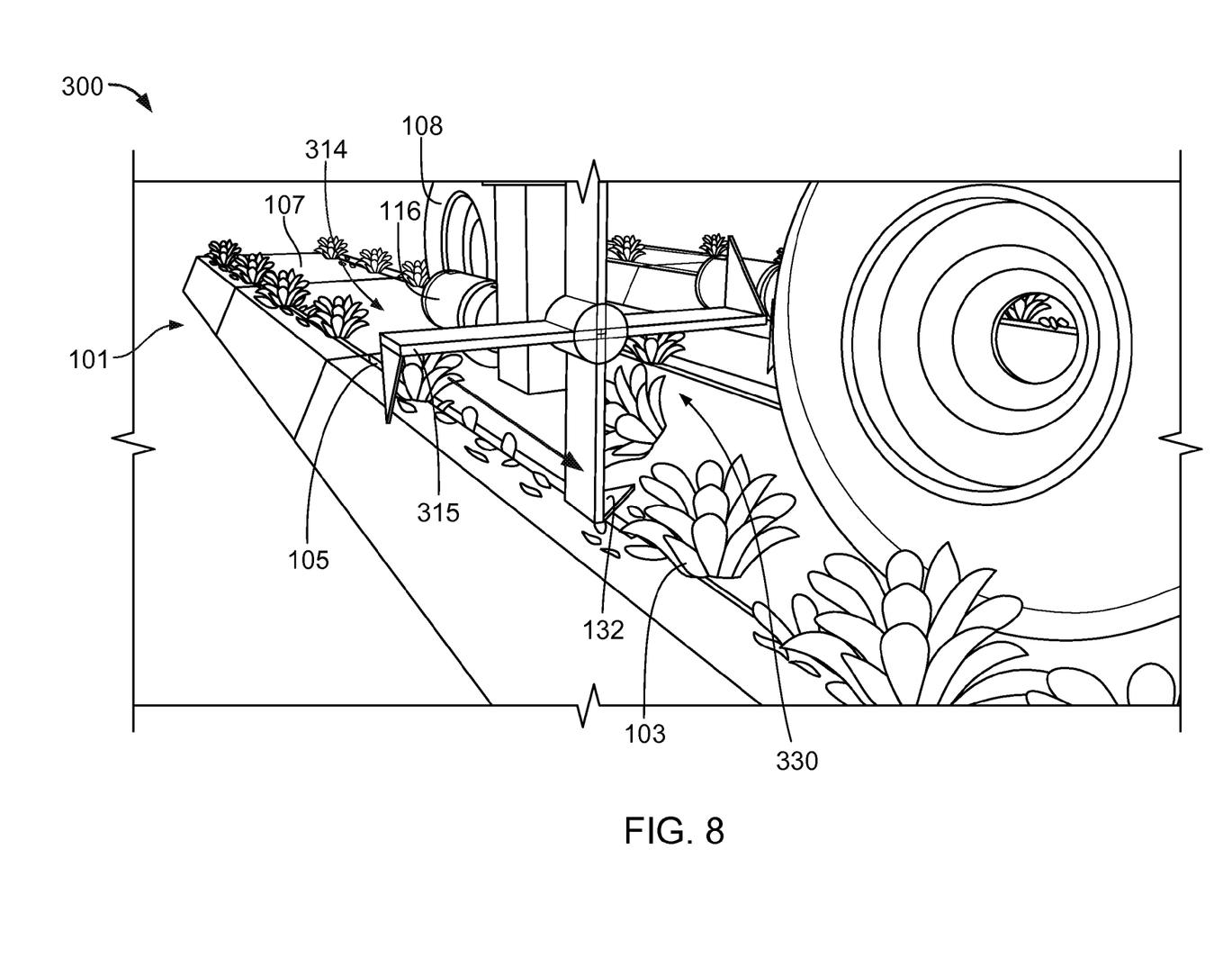
FIG. 8 is a perspective view showing a portion of a thinning and weeding system, including a cutter with arms oriented within perpendicular planes.

The cutter 314 is substantially similar in construction to the cutter 114, with the exception that arms 315 of the cutter 314 are oriented in respective planes that are perpendicular to each other. Accordingly, the cutter 314 defines four gaps 330 that are spaced about 90 degrees from each other and includes the knives 132. In some examples, the cutter 314 may not be rotated but instead may be translated (e.g., pulled) along with the movement of the lower frame 106 in order to cut a series of undesired plants 103 and is operable to rotate with respect to the lower frame 106 in order to cut certain plants 103. In some examples, once the cutter 314 approaches a plant 103 to be saved, the cutter 314 may be rotated such that the cutter 314 passes over the plant 103. In some examples, the cutter 314 may be rotated at a speed of about 20 rpm to about 40 rpm (e.g., 30 rpm).

While the thinning and weeding systems 100, 300 have been described as including the cutters 114, 314 with knives 132 that extend from the arms 115, 315 of the cutters 114, 314 in a direction of travel of the thinning and weeding systems 100, 300, in some embodiments, a thinning and weeding system may include a cutter including knives that extend from the arms of the cutters in directions both along and opposed to a direction travel of the thinning and weeding system. For example, FIG. 9 displays a perspective view of a portion of a thinning and weeding system 400 that includes a cutter 414 that includes wide-blade knives 432. The thinning and weeding system 400 is substantially similar in construction and function to the thinning and weeding systems 100, 300, with the exception that the thinning and weeding system 400 includes the cutter 414 instead of the cutter 114 or the cutter 314. For example, the thinning and weeding system 400 includes the machine vision system 112, the lower frame 106, the inner wheels 108, the vertical adjustment devices 134, the motors 116, the actuators 136, and other components of the thinning and weeding system 100.

Figure 9:
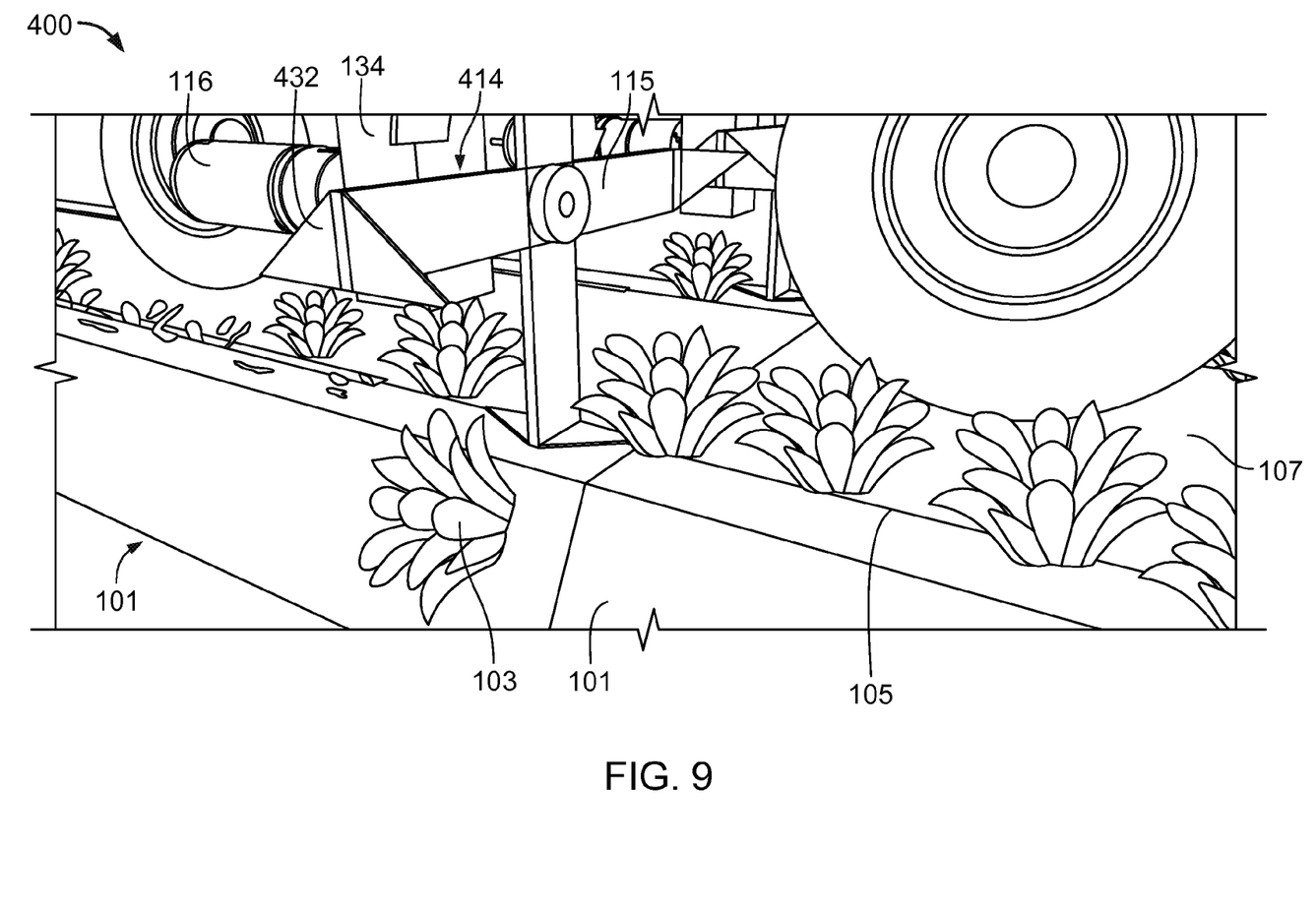
FIG. 9 is a perspective view showing a portion of a thinning and weeding system, including a cutter with wide-blade knives.

The cutter 414 is substantially similar in function to the cutter 114, with the exception that the cutter 414 includes the knives 432 that extend from the arms 115 of the cutters 414 in directions both along and opposed to a direction travel of the thinning and weeding system 400. In some examples, the cutter 414 may advantageously cover more ground and accordingly cut more plant material (e.g., as compared to the cutter 114) for a given rotational speed. As a result, the cutter 414 may be rotated at a reduced angular speed (e.g., as compared to the angular speed of the cutter 114) while still covering the same amount of ground. Additionally, support of the knives 432 by the arms 115 along centers of the knives 432 reduces the torque load placed on the arms 115 by the knives 432.

While the thinning and weeding systems 100, 300, 400 have been described as including the cutters 114, 314, 414 that include four arms 115, 315, 415 and four respective knives 132, 432 extending in a plane of the cutters 114, 314, 414, in some embodiments, a thinning and weeding system may include a cutter that has a different number of arms and knives. For example, FIG. 10 displays a perspective view of a portion of a thinning and weeding system 500 that includes a cutter 514 that includes one arm 315 and one knife 132 extending from an end of the arm 315. The thinning and weeding system 500 is substantially similar in construction and function to the thinning and weeding systems 100, 300, 400, with the exception that the thinning and weeding system 500 includes the cutter 514 instead of the cutter 114, 314, or 414. For example, the thinning and weeding system 500 includes the machine vision system 112, the lower frame 106, the inner wheels 108, the vertical adjustment devices 134, the motors 116, the actuators 136, and other components of the thinning and weeding system 100.

Figure 10:
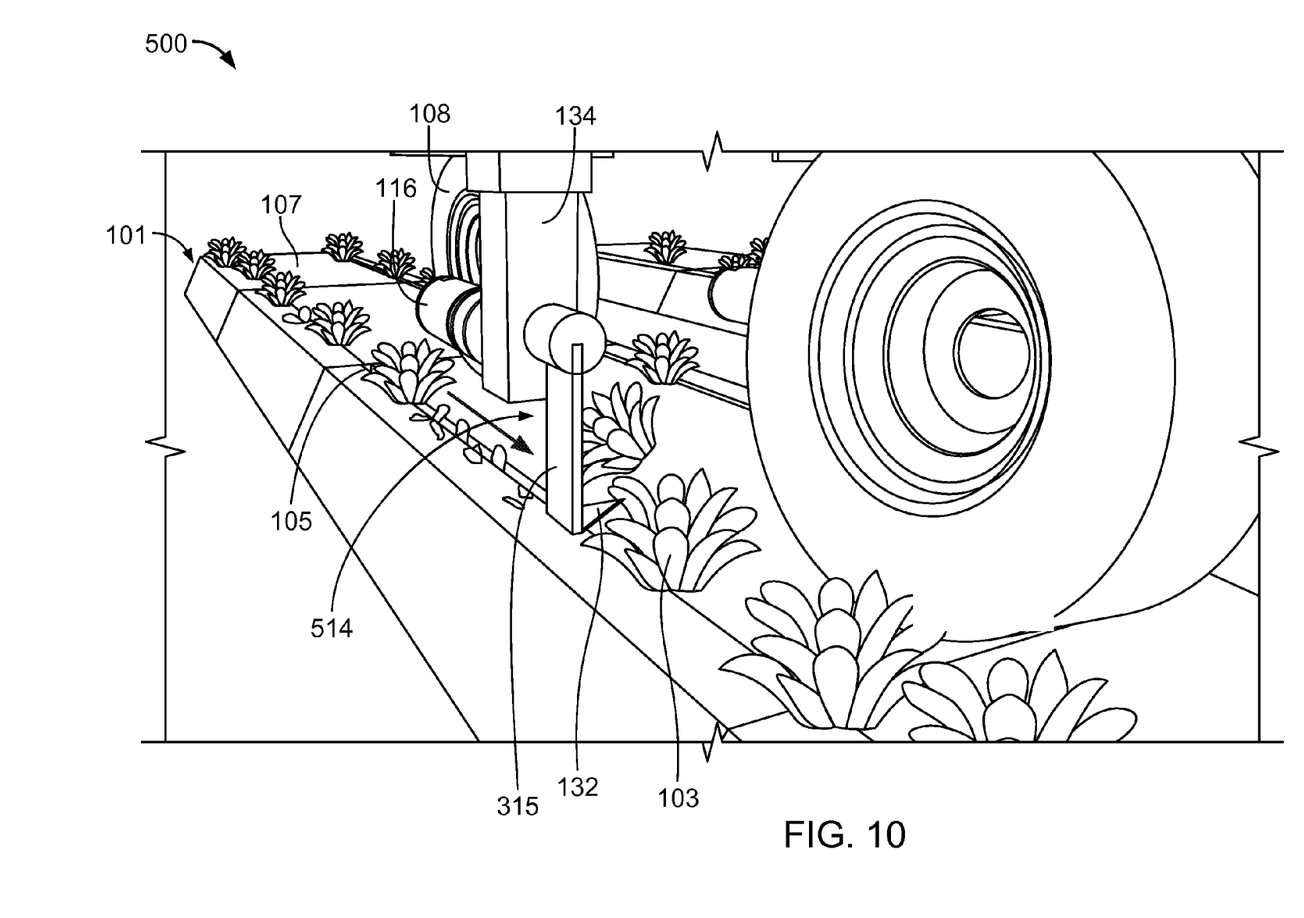
FIG. 10 is a perspective view showing a portion of a thinning and weeding system, including a cutter with a single arm and knife.

The cutter 514 is substantially similar in function to the cutter 314, with the exception that the cutter 514 includes one arm 315 and one knife 132 instead of four arms 315 and four knives 132. Accordingly, in some examples, the cutter 514 may not be rotated but instead may be translated (e.g., pulled) along with the movement of the lower frame 106 in order to destroy a series of undesired plants 103 and is operable to rotate with respect to the lower frame 106 in order to cut the undesired plants 103. In some examples, once the cutter 514 approaches a plant 103 to be saved, the cutter 514 may be rotated such that the cutter 514 passes over the plant 103. In some examples, the cutter 514 may be rotated at a speed of about 100 rpm to about 140 rpm (e.g., 120 rpm). The single-arm configuration of the cutter 514 provides the cutter 514 with a lower inertia than the cutter 314 and accordingly requires less power to achieve a given rotational speed.

Figure 11:
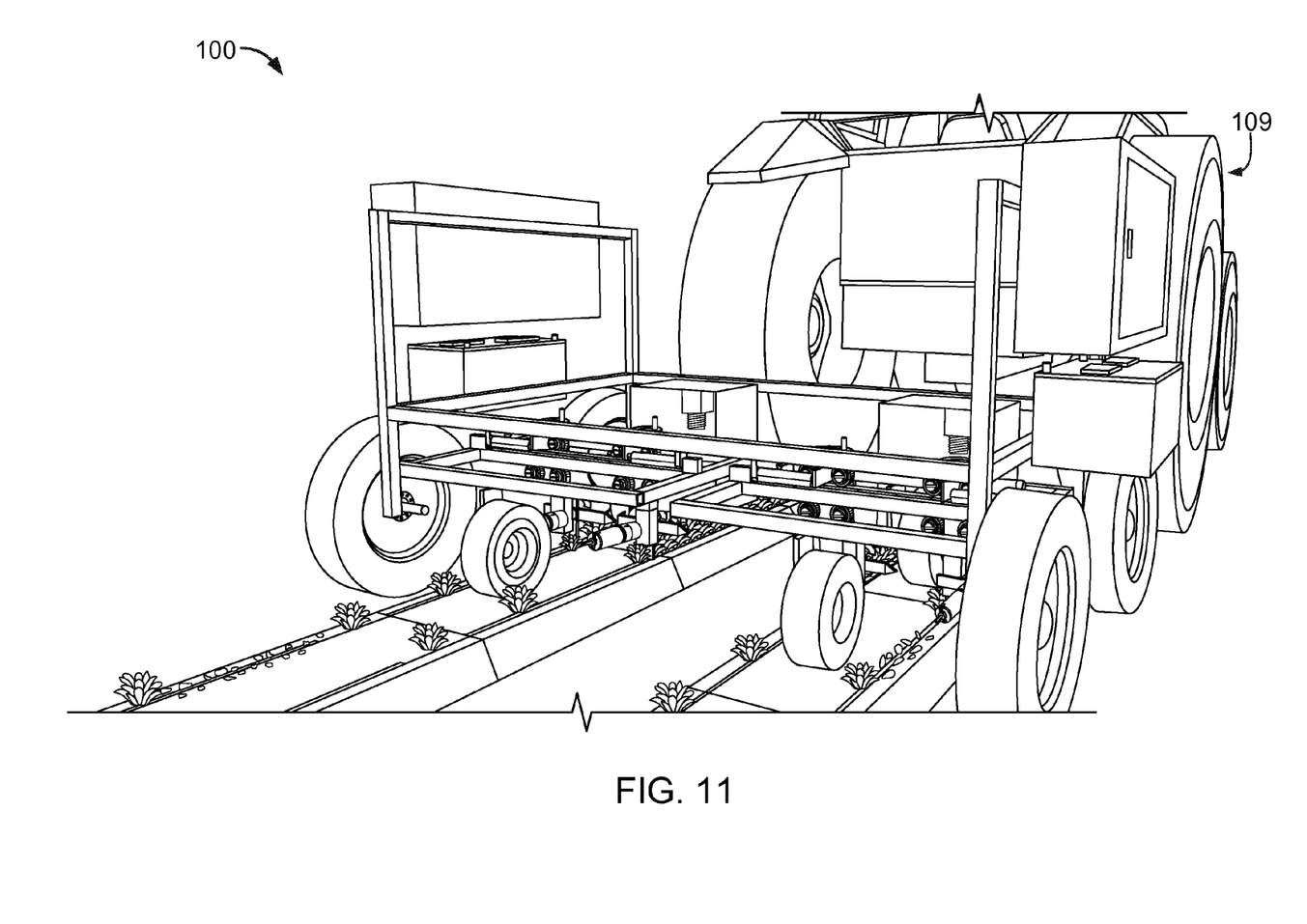
FIG. 11 is a rear perspective view of the thinning and weeding system of FIG. 1, assembled with a tractor.

While the thinning and weeding system 100 has been described as operating autonomously, in some embodiments, any of the thinning and weeding systems 100, 300, 400, 500 may be attached to a vehicle (e.g., tractor) that is operable to pull the thinning and weeding system 100, 300, 400, 500. For example, FIG. 11 displays the thinning and weeding system 100 attached to a tractor 109. The thinning and weeding systems 100, 300, 400, 500 may be attached to the tractor 109 via a three-point hitch or any other suitable attachment mechanisms known to a person skilled in the art. In the example of FIG. 11, the tractor 109 is controlled by an operator (e.g., who rides the tractor 109) using a wireless monitor (not shown) to control the thinning and weeding system 100 as the thinning and weeding system 100 travels along the beds 101 of plants 103. Accordingly, the operator of the tractor 109 may determine one or more of the various operational parameters (e.g., a travel speed) of the thinning and weeding system 100.

Thus, while a number of examples have been described for illustration purposes, the foregoing description is not intended to limit the scope of the invention, which is defined by the scope of the appended claims. There are and will be other examples and modifications within the scope of the following claims.

What is claimed is:

1. A method of selectively eradicating plants, comprising:
   generating images of a plurality of plants arranged in a bed using a camera mounted to a mobile chassis moving along the bed;

determining respective locations of the plurality of plants from the generated images;

selecting from among the plurality of plants one or more target plants to be eradicated; and eradicating the one or more target plants by accelerating a blade of a rotary cutter to strike the one or more target plants as the mobile chassis moves along the bed, and by decelerating the blade to avoid eradicating unselected plants as the mobile chassis moves along the bed, wherein the rotary cutter is carried by the mobile chassis and rotatable about an axis extending in the direction along which the mobile chassis is moved.

2. The method of claim 1, wherein the camera that is directed towards the bed and a processor is operable to analyze the images.

3. The method of claim 1, wherein a hood surrounds the camera.

4. The method of claim 1, further comprising identifying the plurality of plants in the generated images using a recognition algorithm.

5. The method of claim 1, wherein the plurality of plants comprises one or more of beets, carrots, lettuce, romaine, onions, parsnips, radishes, rutabagas, spinach, corn, and turnips.

6. The method of claim 1, wherein selecting the one or more target plants comprises comparing the respective locations of the plurality of plants to a predetermined spacing.

7. The method of claim 6, further comprising identifying one or more plants that are positioned within the predetermined spacing as the one or more target plants.

8. The method of claim 1, wherein eradicating the one or more target plants comprises severing leaves and stems of the one or more target plants.

9. The method of claim 1, further comprising identifying one or more weeds in the bed using a recognition algorithm.

10. The method of claim 9, further comprising cutting the one or more weeds using the rotary cutter.

11. The method of claim 1, wherein the rotary cutter comprises arms extending from a rotational center of the rotary cutter and defining gaps therebetween, and wherein the rotary cutter comprises blades that extend from ends of the, respectively.

12. The method of claim 11, wherein the rotary cutter is responsive to a controller to position the rotary cutter such that the unselected plants pass through the gaps.

13. The method of claim 11, wherein the blades are configured to cut the plurality of plants.

14. The method of claim 11, wherein the blades extend from the arms in a direction of travel of the mobile chassis.

15. The method of claim 11, wherein the blades extend from the arms in a direction opposed to a direction of travel of the mobile chassis.

16. The method of claim 11, wherein the arms of the rotary cutter are oriented within a single plane.

17. The method of claim 11, wherein the arms of the rotary cutter are oriented within respective perpendicular planes.

18. The method of claim 1, further comprising eradicating the one or more target plants by dragging the rotary cutter along the bed.

19. The method of claim 1, wherein the rotary cutter is movable via a floating frame configured to move vertically as a function of a height of the surface of the bed.

20. The method of claim 19, wherein a vertical adjustment device is mounted to the floating frame, the vertical adjustment device supporting the rotary cutter.

21. The method of claim 1, wherein prior to eradicating the one or more target plants, the rotary cutter is moved in a lateral direction by an actuator configured to translate the rotary cutter.

22. The method of claim 1, wherein the images are generated, the respective locations of the plurality of plants are determined, the one or more target plants are selected, and the one or more target plants are eradicated, while the mobile chassis moves at a constant speed along the bed.

23. The method of claim 1, wherein the rotary cutter comprises an arm extending from a rotational center of the rotary cutter, the blade extending from an end of the arm.

24. The method of claim 23, wherein the blade is configured to cut the plurality of plants.

* * * * *